(12) United States Patent
Mishra et al.

(10) Patent No.: US 11,115,329 B1
(45) Date of Patent: Sep. 7, 2021

(54) MULTICAST SUBSCRIPTION IN MLDP NETWORK WITH BIER CORE

(71) Applicant: Cisco Technology, Inc., San Jose, CA (US)

(72) Inventors: Mankamana Prasad Mishra, San Jose, CA (US); IJsbrand Wijnands, Leuven (BE); Nagendra Kumar Nainar, Morrisville, NC (US); Nitin Kumar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/664,582

(22) Filed: Oct. 25, 2019

(51) Int. Cl.
*H04L 12/721* (2013.01)
*H04L 12/741* (2013.01)
*H04L 12/723* (2013.01)
*H04L 12/761* (2013.01)

(52) U.S. Cl.
CPC .............. *H04L 45/72* (2013.01); *H04L 45/16* (2013.01); *H04L 45/34* (2013.01); *H04L 45/50* (2013.01); *H04L 45/74* (2013.01)

(58) Field of Classification Search
CPC ......... H04L 45/72; H04L 45/50; H04L 45/16; H04L 45/74; H04L 45/34
See application file for complete search history.

(56) References Cited

U.S. PATENT DOCUMENTS

| 2007/0104194 | A1* | 5/2007 | Wijnands | ............... H04L 45/50 370/390 |
| 2015/0139228 | A1* | 5/2015 | Wijnands | ............... H04L 45/74 370/390 |
| 2017/0317841 | A1* | 11/2017 | Xu | ........................ H04L 12/185 |
| 2018/0131532 | A1* | 5/2018 | Wijnands | ............. H04L 12/1886 |
| 2019/0097943 | A1* | 3/2019 | Kotalwar | ............. H04L 49/201 |
| 2020/0007358 | A1* | 1/2020 | Bidgoli | ............... H04L 12/2861 |
| 2020/0245206 | A1* | 7/2020 | Allan | ...................... H04L 45/04 |
| 2020/0267011 | A1* | 8/2020 | Peng | .................. H04L 12/1886 |

FOREIGN PATENT DOCUMENTS

WO    WO-2017059708 A1 *  4/2017    ............ H04L 45/04

\* cited by examiner

*Primary Examiner* — Umar Cheema
*Assistant Examiner* — James Ross Hollister
(74) *Attorney, Agent, or Firm* — Lee & Hayes, P.C.

(57) ABSTRACT

This disclosure describes a method usable in a network that has a combination of mLDP-capable and BIER-capable devices. The disclosed method includes advertising, by an mLDP-capable multicast source, an indication of a BIER edge router that it has determined is usable as a path between the BIER devices and the mLDP-capable multicast source. A provider edge router can include in a multicast join message both an indication of the mLDP-capable multicast source as well as the indication of the BIER router advertised as being usable as the path to the mLDP-capable multicast source. The BIER devices can communicate with each other to pass a multicast join message to the BIER edge router that is indicated as being usable as the path to the mLDP-capable multicast source.

20 Claims, 5 Drawing Sheets

MULTICAST SUBSCRIPTION IN MLDP NETWORK WITH BIER CORE

TECHNICAL FIELD

The present disclosure relates generally to multicast routing and, more specifically, to a methodology that allows for a gradual migration from a label-based core to a bit-index-based core.

BACKGROUND

IP multicast is a methodology for distributing content from a network host to multiple receivers. In some examples, the content is video that is simultaneously streamed to multiple receivers. In a basic form, IP multicast includes creating, in a multicast routing table for each router that is part of a multicast tree, a multicast routing and forwarding entry for each multicast tree of which the router is a part. Multiprotocol Label Switching (MPLS) networks on the other hand, rather than using long network addresses for routing, use short path labels to route data from one router to the next. See, for example, RFC 3031 dated January 2001. The label assignments may be propagated from egress routers of the network to ingress routers of the network using a Label Distribution Protocol. See, for example, RFC 5036 dated October 2007.

Furthermore, an extension to LDP, known as Multipoint Label Distribution Protocol (mLDP), provides extensions to the basic label distribution protocol, for the setup of routing paths for multicast data distribution. See, for example, RFC 6388 dated November 2011. An even more recent protocol for multicast data distribution is known as Bit Index Explicit Replication (BIER). See, for example, RFC 8279 dated November 2017. BIER removes the need for maintaining multicast state information from devices in a network. A BIER header, included in multicast packets by an ingress router, is used by devices in the network to forward the multicast packets.

It may be desirable to convert mLDP-based networks to BIER-based networks. However, it can be more efficient to gradually migrate from mLDP to BIER, without changing the entire network simultaneously. In one example, a provider may wish to utilize BIER for newly-installed devices but continue to use mLDP for legacy devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
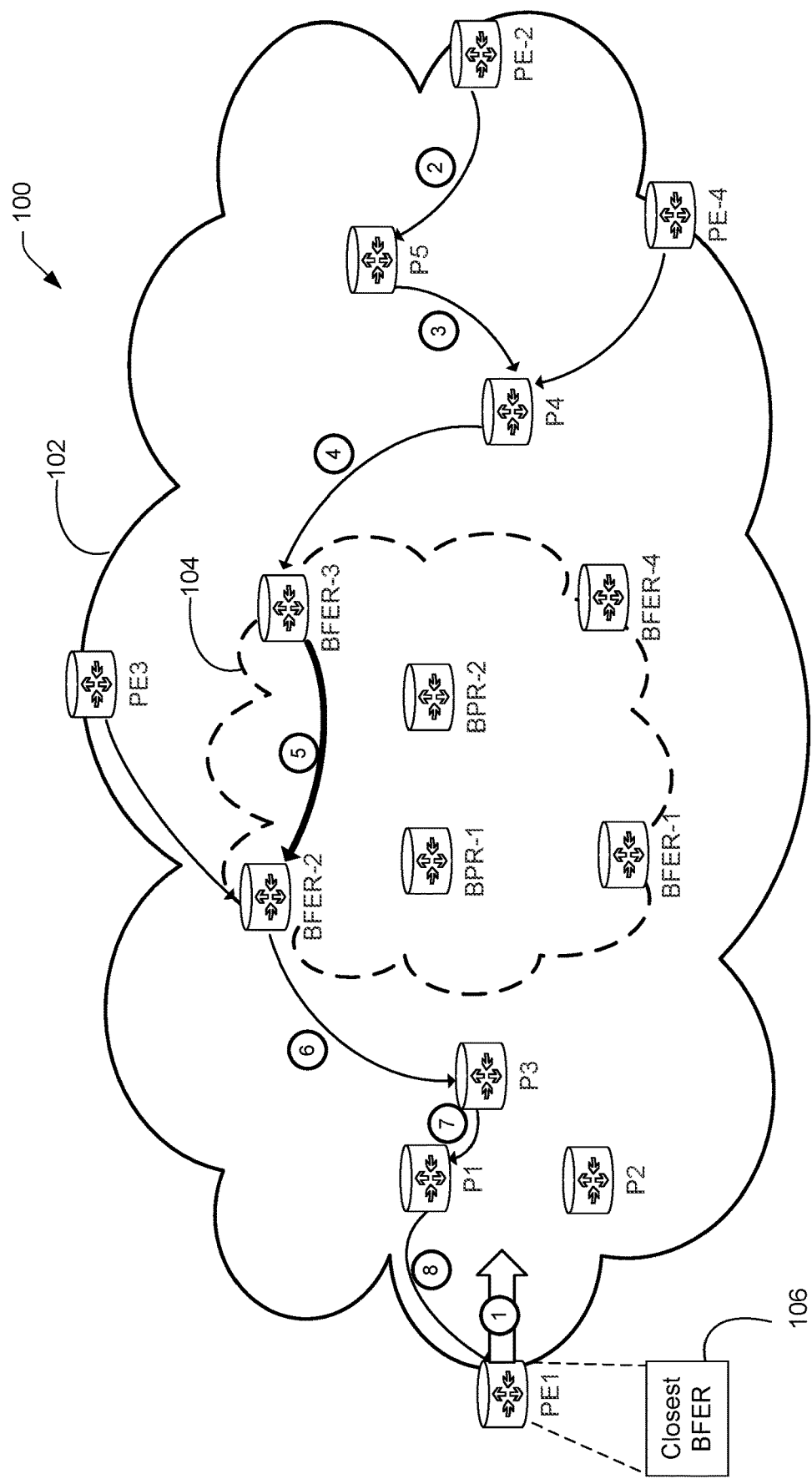
FIG. 1 illustrates a system architecture diagram of an example environment that includes a network of mLDP devices with a BIER core.

This disclosure describes a method for a subscribing node in a network to subscribe to a multicast group. The method includes, by the subscribing node, receiving a message including an indication of a Bit-Forwarding Egress Router (BFER) associated with a destination edge router that is a source of data of the multicast group. The method further includes, by the subscribing node, transmitting a multicast join message. The multicast join message comprises at least the indication of the BFER associated with the destination edge router and an indication of the destination edge router.

Additionally, the techniques described herein may be performed by a system and/or device having non-transitory computer-readable media storing computer-executable instructions that, when executed by one or more processors, performs the methods described herein.

Example Embodiments

The described methods are usable, for example, in a network that has a combination of mLDP-capable and BIER-capable devices. For example, it may be desirable to gradually upgrade a network originally including mLDP-capable devices to also include BIER-capable devices. In some examples, the mLDP-capable devices will never be upgraded to BIER-capable devices, but it is desirable that the mLDP-capable devices be able to interoperate with newly-installed, BIER-capable, devices.

In some examples, each bit-forwarding egress router (BFER), typically when it first starts up or joins a network, advertises the address of the BFER. The BFER also advertises an indication that it is a BFER. Such advertisements are received not only by other BIER-capable devices but, also, the advertisements are received by mLDP-capable devices in the network.

Each mLDP-capable multicast source uses the advertised information from each BFER device—the address of the BFER and the indication that it is a BFER—to determine which BFER it may use to interface from the mLDP-capable portion of the network to the BIER-capable portion of the network. For example, an mLDP-capable multicast source may have received advertisements from multiple BFERs, and the mLDP-capable source may determine to use the closest BFER to interface from the mLDP-capable portion of the network to the BIER-capable portion of the network. The closest BFER may be the closest in terms of number of hops to reach the BFER, or other measures of closeness may be utilized (e.g., latency of packet travel to each BFER, geographic distance, etc.), and this may depend on what information about the BFERs the mLDP-capable multicast source has available to it.

The method further includes advertising, by an mLDP-capable multicast source, an indication of the BFER that it has determined is usable as a path between the BIER devices and the mLDP-capable multicast source. As mentioned above, a BFER that an mLDP-capable multicast source has determined is usable as a path between the BIER devices and the mLDP-capable multicast source may be the BFER that is closest to the mLDP-capable multicast source. A provider edge router (PER) that utilizes a multicast join methodology to subscribe to (or join) the mLDP-capable multicast source can include both an indication of the mLDP-capable multicast source as well as the indication of the BIER router that was advertised as being usable as the path to the mLDP-capable multicast source. By including the indication of the BIER router that was advertised as being usable as the path to the mLDP-capable multicast source, intermediate devices (in the path to the mLDP-capable multicast-source) that are BIER-capable will know how to reach the mLDP-capable multicast source even across BIER-capable devices.

Therefore, when the multicast join message reaches the BIER portion of the network from the mLDP portion of the network, the BIER devices can communicate with each other to pass the multicast join message to the BIER router that is indicated in the message as being usable as the path to the mLDP-capable multicast source. From the BIER router that is indicated as being usable as the path to the mLDP-capable multicast source, the join message can continue via the mLDP portion of the network on to the mLDP-capable multicast source.

Although the techniques described herein are primarily with reference to IP packets (e.g., IPv4, IPv6, etc.), the techniques are generally applicable to any type of protocol, implemented at any layer, that may be used to encapsulate a multicast join message (e.g., IPsec, UDP, TCP, etc.). Similarly, the techniques may be applied to transmit multicast join messages along multi-hop paths between hardware devices, virtual resources (e.g., virtual machines, containers, etc.) running on devices, and/or any combination thereof. While the techniques are described with reference to IP packets, the techniques are equally applicable to any type of packets used to transmit multicastjoin messages on a multi-hop path. The techniques described herein improve upon previous techniques by enabling multicast usage in mLDP-capable networks having a BIER core, among other improvements and advantages.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 that includes a network 102 of devices. Network 102 may be any type of network that would implement multicast. One example of an application which may use multicast is a video server sending out video transmission simultaneously to each of many delivery platforms, such as homes. Simultaneous delivery of video to many destinations by unicast could exceed the capability of many servers. Multicasting is a technique to deliver the same data simultaneously from one server to many receivers/clients. The destination of a multicast packets denotes a specific multicast group. Multicast is a way to scale transmission of the same data, such as video, to groups of devices that subscribe to the data.

Multicast clients receive the multicast data only if they have elect to receive it (by joining a specific multicast group address). Membership of a group may be dynamic and controlled by the receivers. The routers in a multicast network learn which sub-networks have active clients for each multicast group and attempt to minimize the transmission of packets across parts of the network for which there are no active clients. Multicast transmission can provide significant bandwidth savings over transmitting the same data to multiple receives using unicast.

The network 102 may be a Local Area Network (LAN), Wide Area Network (WAN), personal area network (PAN) or any other network that supports internet protocol (IP), since multicast is essentially an IP protocol. The network 102 comprises a plurality of mLDP edge routers, a plurality of mLDP routers and a BIER core 104, all of which are IP routers. The plurality of mLDP edge routers may comprise a first mLDP edge router PE-1, a second mLDP edge router PE-2, a third mLDP edge router PE-3 and a fourth mLDP edge router PE-4. The plurality of mLDP routers may include a first mLDP router P1, a second mLDP router P2, a third mLDP router P3, a fourth mLDP router P4 and a fifth mLDP router P5. BIER core 104 may comprise a plurality of BIER edge routers (bit-index forwarding routers, or BFERs) including a first BIER edge router BFER-1, a second BIER edge router BFER-2, a third BIER edge router BFER-3 and a fourth BIER edge router BFER-4. BIER core 104 may also include BIER core devices BPR-1 and BPR-2.

For example, the BIER core 104 may have been added to an otherwise all mLDP-capable network because the mLDP-capable network is being upgraded, and BIER-capable devices are later generation than mLDP capable devices. On the other hand, the mLDP-capable devices may operate suitably, such that it is desired to not replace the mLDP-capable devices with BIER-capable devices if such replacement is not necessary.

mLDP-capable routers are routers that, for multicast, operate according to an mLDP protocol. The mLDP protocol is a label-switching protocol, for multicast, via which devices in a network are routed from device to device using short path labels that are part of the state of each device. Typically, routing of mLDP packets uses multi-protocol label switching, meaning that the mLDP devices operate according to a short label stored as part of the state of the device. The packets are multi-protocol; they may encapsulate packets of multiple underlying protocols.

With systems comprised of mLDP devices and no BIER devices, each node in-a network may run an mLDP session. For example, with such systems, a leaf node may initiate mLDP signaling towards a root of a tree where the whole core may use mLDP enabled signaling. Bit Index Explicit Replication (BIER) may comprise an alternative process for multicast forwarding. It may not require any multicast-specific trees, and hence may not require any multicast-specific tree building protocols. Within a given "BIER domain", an ingress node may encapsulate a multicast data packet in a "BIER header". The BIER header may identify a packet's egress nodes in that domain. Each possible egress node may be represented by a single bit within a bitstring. To send a packet to a particular set of egress nodes, an ingress node may set the bits for each of those egress nodes and may clear other bits in the bitstring. Each packet may then be forwarded along a unicast shortest path tree from the ingress node to the egress nodes. Thus there may be no per-flow forwarding entries with BIER.

Embodiments of the disclosure, as illustrated in FIG. 1, may provide, for example, a migration strategy for service providers to move to a BIER core while the remainder of the network are still mLDP-enabled devices. Accordingly, mLDP may be used from the edge routers to a BIER core. From the near edge of the BIER core to the far edge of the BIER core, BIER routing is utilized.

In one example, an mLDP edge router learns what BIER edge router is closest to the mLDP edge router, or is otherwise associated with the mLDP edge router, and stores an indication thereof. The stored indication is shown in FIG. 1 by reference numeral 106, which is a stored indication of the BIER edge router that is closest to or otherwise associated with mLDP edge router PE-1. The BIER edge router may, for example, advertise its loopback and also that it is a BIER edge router. When a first mLDP edge router advertises itself as a source of multicast data, it may also advertise an indication of the closest BIER edge router to the first mLDP edge router or the BIER edge router that is otherwise associated with the first mLDP edge router. In this way, devices that transmit to the first mLDP edge router over an mLDP network having a BIER core will know how to reach the first mLDP edge router notwithstanding the BIER core. Furthermore, these transmitting devices will be able to tell intermediate devices, in a route toward the first mLDP edge router, how to get the message to the first mLDP edge router notwithstanding the BIER cord. Thus, for example, when another mLDP edge router transmits a multicast join message to subscribe to multicast data from the first mLDP edge router, the join message may include both an indication of the first mLDP edge router and an indication of the BIER router closest to or otherwise associated with the first mLDP edge router.

The devices of the network 102 may be configured to be able to operate on the multicast join message such that the multicast join message can traverse both the mLDP devices of the network 102 and the BIER core 104, to reach the first mLDP edge router. For example, mLDP-capable devices may operate on the multicast join message as they would in an all mLDP-capable network. In other words, the mLDP-capable devices may route a multicast join message transmitted from an mLDP-capable device in accordance with mLDP routing, using short path labels to route data from one router to the next according to a label switching technique. Furthermore, BIER-capable devices may route the multicast join message transmitted from the same mLDP-capable device according to a BIER header transmitted with the packet since, unlike mLDP-capable devices, BIER-capable devices do not maintain multicast state information in the devices. This duality of routing, via both mLDP-capable devices and BIER-capable devices, is made possible at least in part by the presence of both mLDP-related and BIER-related routing information in the transmitted multicast join message.

Thus, for example, at "1" in FIG. 1, the mLDP edge router PE1 may broadcast its availability as a multicast source, along with an indication of the BIER router closest to or otherwise associated with the mLDP edge router PE1. At "2", the mLDP edge router PE2 transmits a multicast join message, which is received by mLDP router P5 and transmitted at "2" to mLDP router P4. At "3", mLDP router P4 further transmits the multicast join message to BFER-3. At "4", using BIER routing as discussed later, BFER-3 transmits the multicast join message to BFER-2, which was indicated by mLDP edge router PE1 as being the BIER router closest to or otherwise associated with mLDP edge router PE1. At "5", the multicast join message is transmitted to mLDP router P3, and then is transmitted to mLDP router P1 at "6". At "7", the multicast join message is transmitted to mLDP edge router PE1, which can then act on the multicast join message to join mLDP edge router PE2 as part of a multicast group handled by mLDP edge router PE1.

The elements described above of environment 100 (e.g., the mLDP edge routers, mLDP routers, BIER edge routers and BIER routers) may be practiced in hardware and/or in software (including firmware, resident software, microcode, etc.) or in any other circuits or systems. The elements of environment 100 may be practiced in electrical circuits comprising discrete electronic elements, packaged or integrated electronic chips containing logic gates, a circuit utilizing a microprocessor, special purposes digital logic, on a single chip containing electronic elements or microprocessors, or any combination thereof. Furthermore, the elements of environment 100 may also be practiced using other technologies capable of performing logical operations such as, for example, AND, OR, and NOT, including but not limited to, mechanical, optical, fluidic, and quantum technologies. The implementation of the various components described herein is a matter of choice which may be dependent on the performance and other requirements of the computing system. Accordingly, the logical operations described herein are referred to variously as operations, structural devices, acts, or modules. It should also be appreciated that more or fewer operations might be performed than shown in the process flowcharts and described herein. These operations can also be performed in parallel, or in a different order than those described herein. Some or all these operations can also be performed by components other than those specifically identified. Although the techniques described in this disclosure is with reference to specific components, in other examples, the techniques may be implemented by less components, more components, different components, or any configuration of components.

Figure 2:
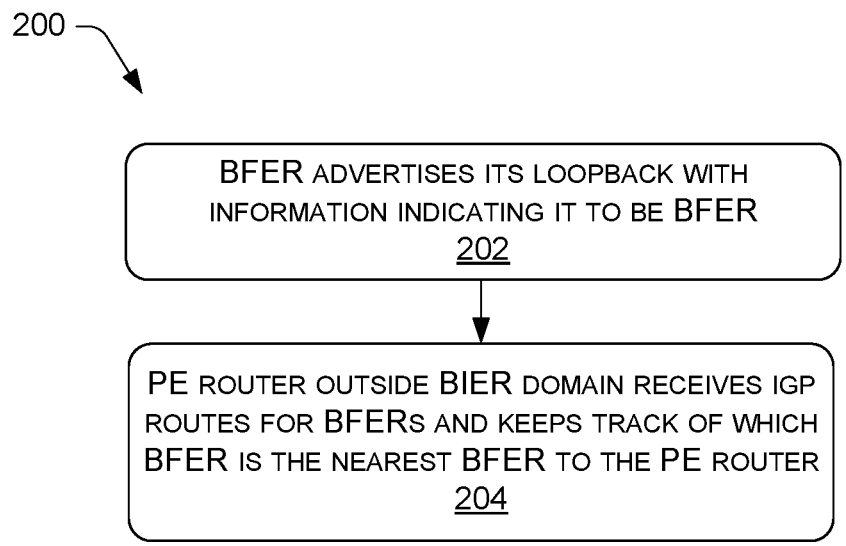
FIG. 2 illustrates a flow diagram of an example process executed by a BIER edge router and a protocol edge router for the protocol edge router to associate the BIER edge router.
Figure 3:
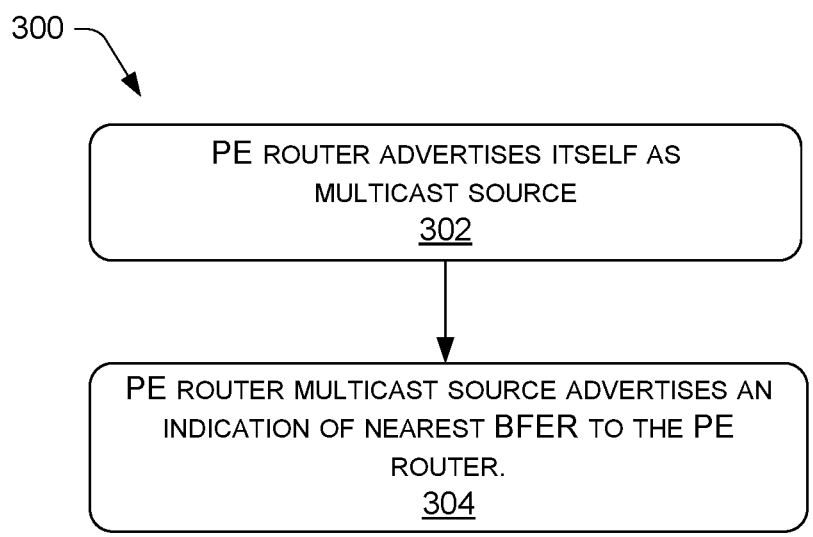
FIG. 3 illustrates a flow diagram of an example process executed by a protocol edge router to advertise itself as a multicast source, including an indication of the associated BIER edge router.

FIG. 2 and FIG. 3 illustrates example processes 200 and 300, respectively, that may be precursor processes to a process for formation and transmission of a multicast join message. As illustrated in the FIG. 2 example process 200, at 202, a BFER advertises its loopback with information indicating it to be a BIER edge router. This advertisement may by Internet Gateway Protocol (IGP) or by some other protocol and is provided at least to mLDP-capable devices outside a BIER core of the network. IGP is a type of protocol used for exchanging routing information between gateways (commonly routers). By advertising to mLDP-capable devices its address and information indicating it to be a BIER edge router, as discussed herein, the BFER may be used as an interface between mLDP-capable devices and a BIER core, for routing of messages according to a multicast protocol.

At 204, an mLDP-capable protocol edge router outside the BIER domain of the network receives IGP routes for BIER edge routers and keeps track of which BIER edge router is the nearest BIER edge router to the protocol edge router or is otherwise associated with the protocol edge router. For example, this information may be stored in memory of the protocol edge router. Thus, for example, an mLDP edge router that is a multicast source may receive the BFER address and indication and may store the BFER address and indication, such as is denoted by reference numeral 106 in FIG. 1. As discussed herein, the mLDP edge router that is a multicast source may then include this BFER address in a multicast source advertisement message. In this way, subscribing mLDP-capable routers can include or otherwise indicate the BFER address in their join messages, and the join messages can successfully reach the multicast source mLDP edge router even through a BIER core that is present in the mLDP network. Thus, for example, multicast join messages can be successfully sent by a subscribing mLDP-capable edge router through a network to a BIER core, the multicast join message can traverse the BIER core to the BFER that is indicated as being closest to or otherwise associated with the multicast source, and the multicast join message can be transmitted on from the BIER core to the mLDP-capable multicast source edge router. In this way, multicast join messages can be transmitted across a network that has a combination of mLDP-capable and BIER-capable devices.

Turning now to the FIG. 3 example process 300, at 302, having stored an indication of the BIER edge router that is closest to or otherwise associated with a protocol edge router, the mLDP-capable protocol edge router advertises itself as a multicast source. This advertisement may be, for example, using Internet Group Management Protocol (IGMP). At 304, the mLDP-capable PE router also advertises an indication of the BIER edge router nearest to or otherwise associated with that PE router. This indication is, for example, the indication received by the mLDP-capable PE router in advertisements by BIER edge routers and stored by the mLDP-capable PE router in a memory of the mLDP-capable PE router.

By advertising the indication of the BIER edge router closest to or otherwise associated with the mLDP-capable PE router, the mLDP-capable PE router is providing an indication to potential mLDP multicast hosts of how to reach the mLDP-capable PE router with multicast join messages, even with the presence of a BIER core that might otherwise be an impediment to the routing of such multicast join messages across an mLDP-capable network having a BIER core. That is, by including the indication of the BIER edge router closest to or otherwise associated with the mLDP-capable PE router in the multicast join message, a BIER edge router closest to or otherwise associated with the joining mLDP multicast host can use BIER routing to the transmit the multicast join message to the BIER edge router closest to or otherwise associated with the mLDP-capable PE router multicast source, which can then transmit the multicast join message across mLDP-capable routers to the mLDP-capable PE router multicast source.

Therefore, the processes illustrated in FIG. 2 and FIG. 3 may be precursor processes for an mLDP network having a BIER core (such as the network 102 with BIER core 104) being able to accomplish an mLDP join operation in accordance with at least some examples described herein.

Figure 4:
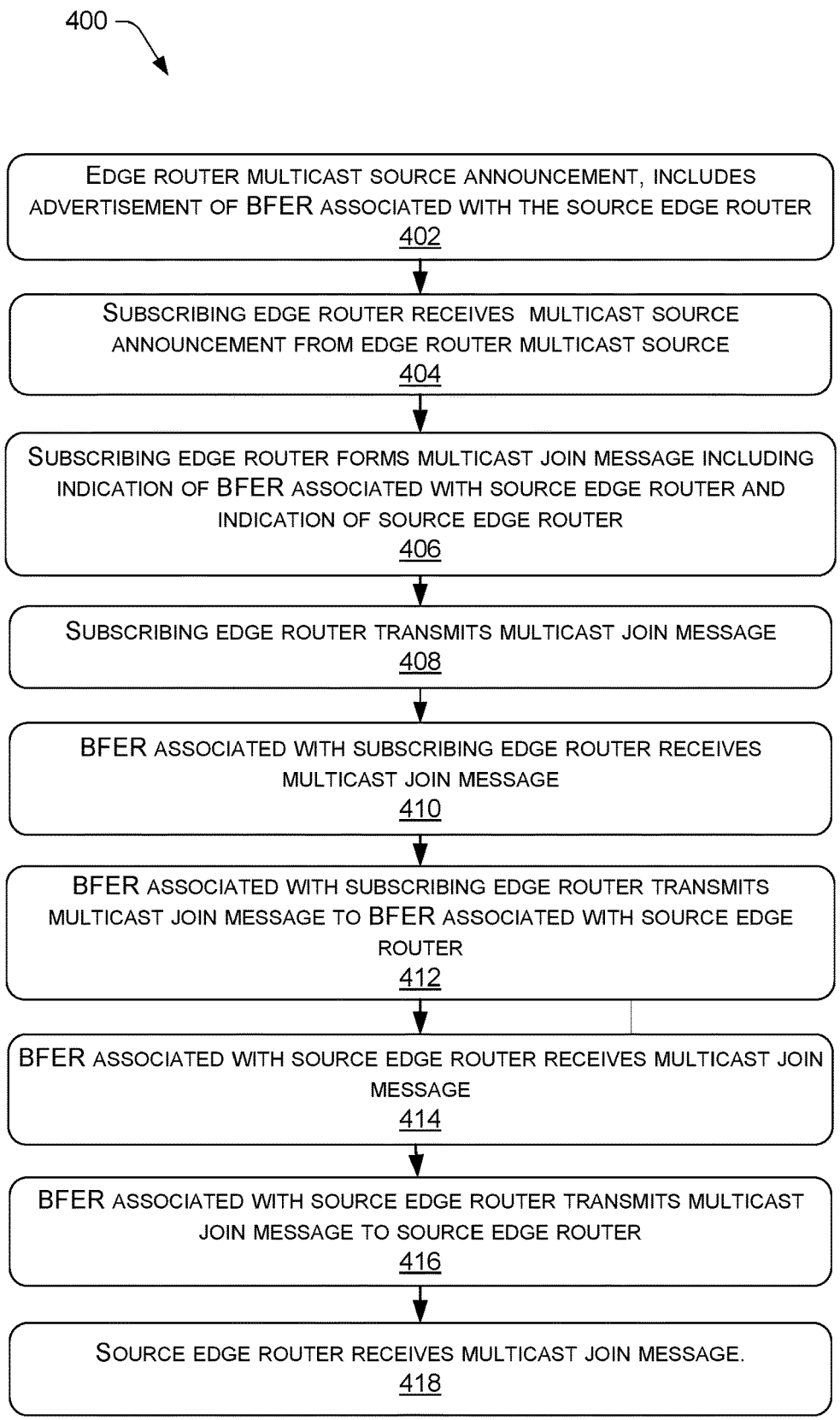
FIG. 4 illustrates a flow diagram of an example process for components of an mLDP network with a BIER core to accomplish a multicast join operation.

FIG. 4 illustrates an example process 400 by which an mLDP-capable host edge router may subscribe to a multicast group. At 402, the mLDP-capable host edge router at the mLDP-capable edge router multicast source (also referred to herein as the "multicast source edge router") announces itself, including an advertisement of an indication of the BFER nearest to or otherwise associated with the mLDP-capable multicast source edge router. The indication of the BFER nearest to or otherwise associated with the mLDP-capable source edge router has been, for example, previously stored in a memory of the mLDP-capable multicast source edge router. The BFER associated with the multicast source edge router is typically, but need not necessarily be, the BFER that is nearest the source edge router. The announcement by the mLDP-capable source edge router may be by IGMP.

At 404, the subscribing mLDP-capable edge router (as well as other mLDP-capable edge routers) receives the announcement from the mLDP-capable edge router multicast source. As a result, the subscribing mLDP-capable edge router is aware that the mLDP-capable source edge router is a multicast source to which the subscribing mLDP-capable edge router may subscribe. Furthermore, because the announcement by the mLDP-capable edge router multicast source and received by subscribing mLDP-capable edge router includes an indication of the BFER closest to or otherwise associated with the mLDP-capable edge router multicast source, a multicast join message sent by the subscribing mLDP-capable edge router may successfully reach the mLDP-capable edge router multicast source, even with the presence of a BIER core in the network.

At 406, the subscribing mLDP edge router forms a multicast join message, which includes not only an indication of the mLDP-capable multicast source edge router, but also includes an indication of the BFER advertised by the mLDP-capable multicast source edge router to be associated with the mLDP-capable multicast source edge router. As discussed below, the indication of the mLDP-capable multicast source edge router and the indication of the BFER advertised by the mLDP-capable multicast source edge router may each be included in separate Forwarding Equivalence Classes (FECs), each of which is a separate header usable to route the multicast join message through the mLDP network having the BIER core.

At 408, the mLDP-capable subscribing edge router transmits the multicast join message that includes the indication of the mLDP-capable multicast source edge router and the indication of the BFER advertised to be associated with the multicast source edge router. In the multicast join message, and as is discussed in greater detail below, the BFER advertised to be associated with the multicast source edge router is indicated as an intermediate destination for the multicast join message (e.g., in a first FEC), and the multicast source edge router is indicated as the final destination for the multicast join message (e.g., in a second FEC). By indicating these destinations (intermediate and final) separately in the multicast join message, the multicast join message can be successfully transmitted in the mLDP network having a BIER core.

At 410, the BFER associated with the subscribing mLDP-capable host edge router receives the multicast join message, on the path towards the intermediate destination of the BFER associated with the mLDP-capable host edge router. The multicast join message may arrive at the BFER associated with the mLDP-capable subscribing edge router by, for example, standard IP routing. Once the multicast join message arrives at the BFER associated with the mLDP-capable subscribing edge router, mLDP cannot be used to traverse the BIER core. Rather, the BFER associated with the mLDP-capable subscribing edge router uses a different method to transmit the multicast join message towards the BFER associated with the mLDP-capable source edge router.

At 412, using a FEC in the multicast join message, the BFER associated with the subscribing mLDP-capable host edge router transmits the multicast join message to the BFER advertised to be associated with the multicast source edge router. Such transmission at 412 may be, for example, using a Targeted Label Distribution Protocol (T-LDP) session created between the BFER associated with the subscribing edge router and the BFER advertised to be associated with the multicast source edge router. T-LDP is, generally, an LDP session between peers that are not directly connected. In other words, T-LDP may be used to signal service labels associated with service tunnels. LDP may comprise a protocol in which routers capable of MPLS may exchange label mapping information. Two routers with an established session are called LDP peers and the exchange of information may be bi-directional. LDP may be used to build and maintain LSP databases that may be used to forward traffic through the MPLS networks. Targeted LDP sessions may be different because, during the discovery phase, hellos are unicast to the LDP peer rather than using multicast. Consequently, T-LDP sessions may be set up between non-directly connected peers, including BFER edge routers that are not directly connected to each other. Consistent with embodiments of the disclosure, BIER BFER ID announcements may be used to setup a full mesh of Targeted LDP sessions. That is, each of the BFERs may be connected to each other BFER in this way. For example, referring back to the example network illustrated in FIG. 1, BFER-1 may have a T-LDP session with BFER-2, with BFER-3 and with BFER-4. BFER-2 may have a T-LDP session with BFER-3 and with BFER-4. And BFER-3 may have a T-LDP session with BFER-4. In this way, any combination of BFERs may be used, as appropriate, to provide a multicast join message across the BIER core 104, so long as the destination BFER (i.e., the BFER closest to or otherwise associated with the mLDP source router) is known. The indication of the BFER in the FEC provides this information for providing the multicast join message across the BIER core. The BIER routers that are not BFERs are not required to participate in the T-LDP session that are used to provide the multicast join messages across the BIER core.

With respect to FIG. 1, for example, in response to determining that the first plurality of network devices comprise BIER edge routers, a Targeted Label Distribution Protocol (T-LDP) session may be created between the BEFR associated with the subscribing mLDP-enabled host edge router and the BFER associated with the mLDP-enabled source edge router. In this way, the multicast join message can traverse the BIER core, in this situation where mLDP cannot be used to traverse the BIER core.

At 414, the BFER advertised to be associated with the mLDP-enabled source edge router receives the multicast join message via the T-LEP session between it and the BFER associated with the mLDP-enabled host router that initiated the multicast join message. At this point, the multicast join message has traversed the BIER core and can be transmitted on to its final destination, the mLDP-enabled source edge router, using the mLDP protocol.

At 416, the BFER associated with the mLDP-enabled source edge router transmits the multicast join message to the mLDP-enabled source edge router using the mLDP protocol. This transmission is enabled by the FEC in the multicast join message that indicates the mLDP-enabled source edge router as the final destination for the multicast join message.

At 418, the mLDP-enabled source edge router receives the multicast join message that was transmitted by the BFER associated with the mLDP-enabled source router, using the mLDP protocol. The mLDP-enabled source edge router initiates a process to configure a route from the mLDP-enabled source edge router to the mLDP-enabled host edge router for the transmission of multicast messages to the mLDP-enabled host edge router. This may include initiating the labeling protocol so that multicast messages may be sent from the mLDP-enabled source edge router to the mLDP-enabled host edge router using the mLDP protocol.

Figure 5:
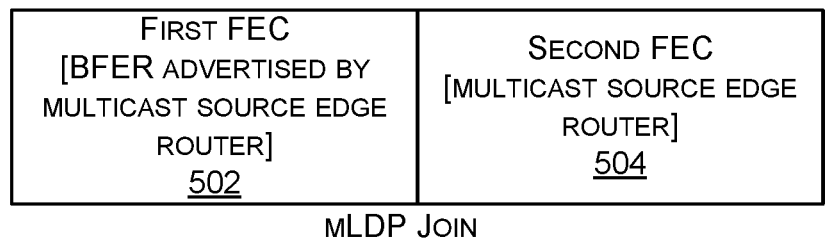
FIG. 5 illustrates an example nested Forwarding Equivalence Class (FEC) formed by a joining mLDP edge router.
Figure 6:
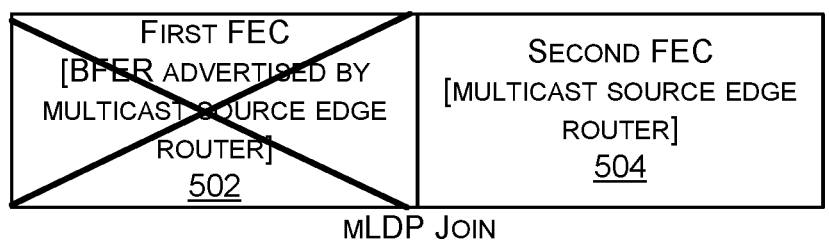
FIG. 6 illustrates the FIG. 5 FEC, as modified in transmit between the joining edge router and a multicast source router.

FIG. 5 and FIG. 6 provide more details of an example of how the subscribing mLDP-enabled host edge router may form the multicast join message including both the indication of the mLDP-enabled source edge router and the indication of the BFER advertised to be associated with the mLDP-enabled source edge router. As discussed above, with these indications in the multicast join message, the multicast join message can traverse the mLDP network that includes the BIER core.

FIG. 5 illustrates an example nested FEC 500 formed by the subscribing edge router. A first FEC 502 of the nested FEC 500 indicates the BFER advertised by the mLDP-enabled source edge router. As discussed relative to the processes illustrated in the flowcharts in FIG. 3 and FIG. 4, with the FEC 502, the multicast join message can reach the BFER associated with the mLDP-enabled source edge router, across the BIER core. Once the multicast join message reaches the BFER associated with the mLDP-enabled source edge router, the first FEC 502 is no longer needed to reach the mLDP-enabled source edge router across the mLDP portion of the network. Still referring to FIG. 5, a second FEC 504 of the nested FEC 500 indicates the mLDP-enabled source edge router. It is the second FEC 504 that is used to transmit the multicast join message from the BFER associated with the mLDP-enabled source edge router to the mLDP-enabled source edge router.

As just discussed, as the multicast join message transits from the mLDP-enabled subscribing edge router towards the mLDP-enabled source edge router, the first FEC 502 is used to direct the multicast join message to the BFER advertised as being associated with the mLDP-enabled source edge router. The multicast join message transits to the BFER associated with the mLDP-enabled host edge router, and then across the BIER core to the BFER associated with the mLDP-enabled source edge router. The BFER associated with the mLDP-enabled source edge router receives the multicast join message and, as illustrated by the example FEC 600 in FIG. 6, deletes the first FEC 502 from the header of the multicast join message.

The second FEC 504 remains, and is used to direct the multicast join message from the BFER associated with the mLDP-enabled source edge router to the mLDP-enabled source edge router, using the mLDP protocol and the labels with which the mLDP-enabled routers in transit were previously configured.

An example will help to illustrate the FIG. 4 example process, and how the FEC 500 (FIG. 5) and FEC 600 (FIG. 6) may be utilized to direct the transmission of a multicast join message across the network 102 having the BIER core 104. In the example and referring to FIG. 1, it is assumed that the PE-2 edge router is the mLDP-enabled host edge router and that the PE-1 edge router is the mLDP-enabled source edge router. Applying the FIG. 4 example process to this scenario, at 402, the PE-1 mLDP-enabled source edge router advertises that it is a multicast source. This is shown by "1" in FIG. 1. The advertisement from the PE-1 mLDP-enabled source edge router also includes an indication that the BFER-2 router is the BIER edge router associated with the PE-1 mLDP-enabled source edge router.

At 404, the PE-2 mLDP-enabled edge router receives the multicast source announcement from the PE-1 mLDP-enabled edge router, including the indication of the BFER-2 router being the BIER edge router associated with the PE-2 mLDP-enabled edge router. This will allow the PE-2 mLDP-enabled edge router to form a multicast join message that can reach the mLDP network even in the presence of a BIER core. That is, the indication of the BFER-2 router in the multicast join message will facilitate the multicast join message traversing the BIER core.

At 406, the PE-2 mLDP-enabled edge router forms the multicast join message, including the indication of the BFER-2 router and the indication of the PE-1 mLDP-enabled source router. Referring to the FIG. 5 example FEC 500, the indication of the BFER-2 router, advertised by the PE-1 mLDP-enabled source router, may be in the first FEC 502. Furthermore, the indication of the PE-1 mLDP-enabled source router may be in the second FEC 504.

At 408, the PE-2 edge router transmits the multicast join message, including the FEC. Referring again to FIG. 1, using the mLDP protocol, the multicast join message having the FEC is transmitted at "2" to the P5 mLDP-enabled router, en route to the BFER-3 BIER edge router. At "3", still using mLDP, the multicast join message having the FEC proceeds to the P4 mLDP-enabled router, en route to the BFER-3 BIER edge router. At "4", still using mLDP, the multicast join message proceeds to the BFER-3 BIER edge router.

At 410, the BFER-3 router, as the BIER edge router closest to or otherwise associated with the PE-2 edge router, receives the multicast join message. From the BFER-3 BIER edge router, the multicast join message cannot be transmitted across the BIER core 104 towards the PE-1 mLDP-enabled source edge router using mLDP.

At 412, the BFER-3 router transmits the multicast join message to the BFER-2 BIER router (see "5" in FIG. 1), according to the indication of the BFER-2 in the first FEC 502. The multicast join message is transmitted from the BFER-3 router to the BFER-2 router (indicated in the first FEC 502) using a T-LDP session or other means to traverse the BIER core 104. For example, a T-LDP session may have been initiated between the BFER-3 router and the BFER-2 router, even though the BFER-2 router and BFER-3 router are not directly connected. As discussed above, a T-LDP session may be formed between two peers that are not directly connected. By initiating T-LDP sessions between and among all BFERs at the edge of the BIER core in the mLDP network, a multicast join message arriving at any BFER can be provided to any other BFER, to traverse the BIER core. More specifically, the multicast join message originating at the mLDP-enabled host edge router PE2 and destined for the mLDP-enable source edge router PE1 can traverse the BIER core, even without the use of the mLDP protocol.

At 414, the BFER-2 router receives the multicast join message having an indication of the BFER-2 router in the first FEC 502. The first FEC is now no longer needed, and the BFER-2 router may delete the first FEC 502, which indicates the BFER-2 router as the intermediate destination for the multicast join message. Referring to the FIG. 6 example, the first FEC 502 may be deleted, leaving only the second FEC 504. The second FEC 504 indicates the ultimate destination of the multicast join message—the PE-1 mLDP-enabled edge router.

At 416, the BFER-2 router transmits the multicast join message, having the first FEC 502 removed, to the PE-1 mLDP-enabled source edge router, as indicated in the second FEC 504. Referring to FIG. 1, this may include, at "6", providing the multicast join message using mLDP from the BFER-2 router to the P3 mLDP-enabled router, towards the PE-1 mLDP-enabled source edge router as indicated in the second FEC 504. Furthermore, at "7", the multicast join message is provided from the P3 mLDP-enabled router to the P1 mLDP-enabled router, heading towards the PE-1 mLDP-enabled source edge router as indicated in the second FEC 504. At "8", the multicast join message is provided to the PE-1 mLDP-enabled source edge router.

At 418, the PE-1 mLDP-enabled source edge router receives the multicast join message and establishes the PE-2 mLDP-enabled host edge router as a destination for multicast packets of the group indicated in the multicast join message.

Figure 7:
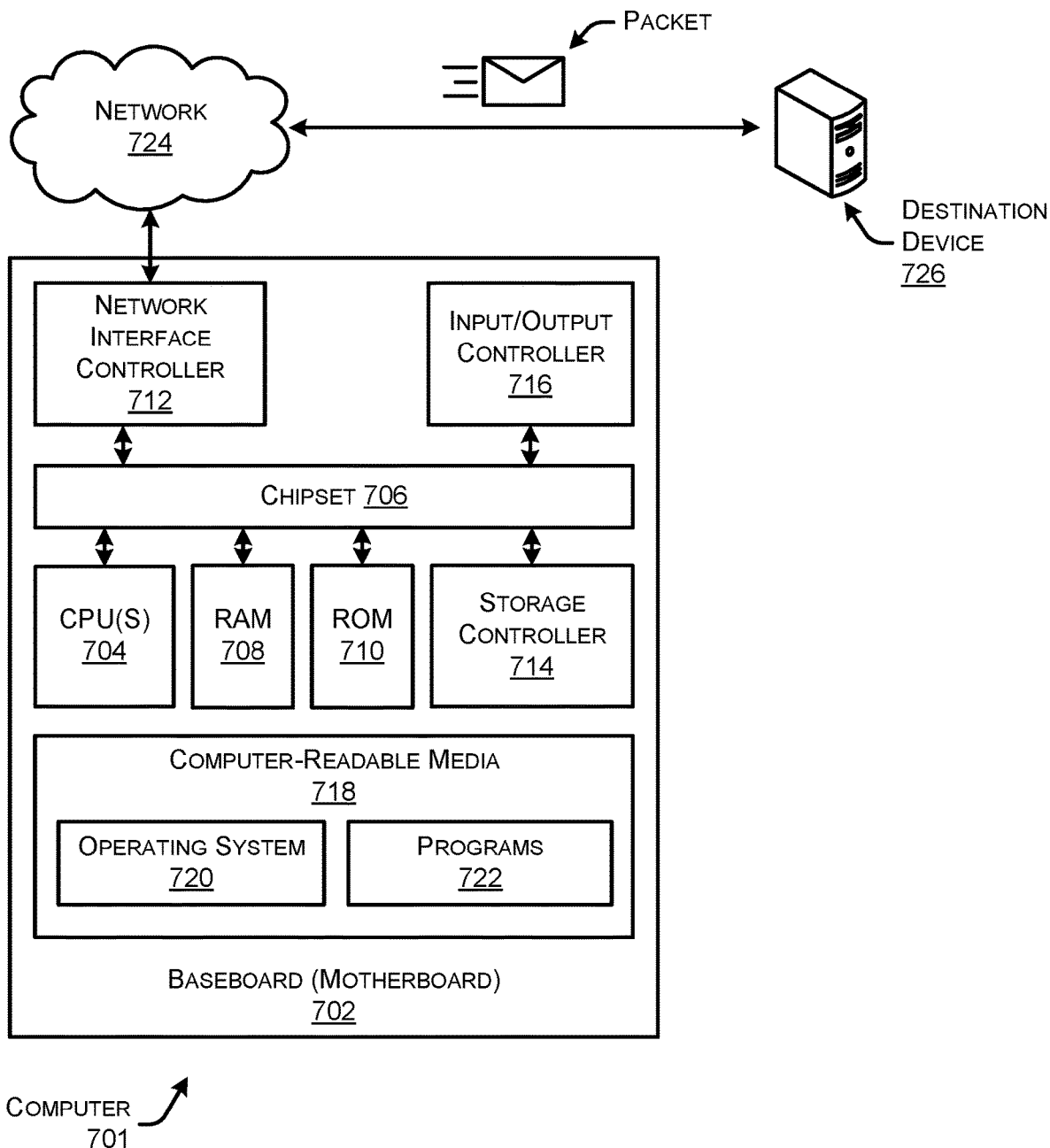
FIG. 7 is a computer architecture diagram showing an illustrative computer hardware architecture for implementing a server device that can be utilized to implement aspects of the various technologies presented herein.

FIG. 7 shows an example computer architecture for a router 701 capable of executing program components for implementing the functionality described above. The computer architecture shown in FIG. 7 illustrates a conventional computer, workstation, desktop computer, laptop, tablet, network appliance, e-reader, smartphone, or other computing device, and can be utilized to execute any of the software components presented herein. The computer 701 may, in some examples, correspond to a physical server 106 described herein, and may comprise networked devices such as servers, switches, routers, hubs, bridges, gateways, modems, repeaters, access points, etc.

The computer 701 includes a baseboard 702, or "motherboard," which is a printed circuit board to which a multitude of components or devices can be connected by way of a system bus or other electrical communication paths. In one illustrative configuration, one or more central processing units ("CPUs") 804 operate in conjunction with a chipset 706. The CPUs 704 can be standard programmable processors that perform arithmetic and logical operations necessary for the operation of the computer 701.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 808, used as the main memory in the computer 702. The chipset 806 can further provide an interface to a computer-readable storage medium such as a read-only memory ("ROM") 710 or non-volatile RAM ("NVRAM") for storing basic routines that help to startup the computer 701 and to transfer information between the various components and devices. The ROM 710 or NVRAM can also store other software components necessary for the operation of the computer 701 in accordance with the configurations described herein.

The computer 701 can operate in a networked environment using logical connections to remote computing devices and computer systems through a network, such as the network 724. The chipset 706 can include functionality for providing network connectivity through a NIC 712, such as a gigabit Ethernet adapter. The NIC 712 can connect the computer 701 to other computing devices over the network 724. It should be appreciated that multiple NICs 712 can be present in the computer 701, connecting the computer to other types of networks and remote computer systems.

The computer 701 can be connected to a storage device 718 that provides non-volatile computer-readable media storage for the computer. The storage device 718 can store an operating system 720, programs 722, and data, which have been described in greater detail herein. The storage device 718 can be connected to the computer 701 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 701 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 701 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 701 can further read information from the storage device 718 by detecting the physical states or characteristics of one or more particular locations within the physical storage units.

In addition to the mass storage device 718 described above, the computer 701 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 701. In some examples, the operations performed by the network 724, and or any components included therein, may be supported by one or more devices like computer 701. Stated otherwise, some or all the operations performed by the network 724, and or any components included therein, may be performed by one or more computer devices 701 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 701. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 718 can store other system or application programs and data utilized by the computer 701.

In one embodiment, the storage device 718 or other computer-readable storage media is encoded with computer-executable instructions which, when loaded into the computer 701, transform the computer from a general-purpose computing system into a special-purpose computer capable of implementing the embodiments described herein. These computer-executable instructions transform the computer 701 by specifying how the CPUs 704 transition between states, as described above. According to one embodiment, the computer 701 has access to computer-readable storage media storing computer-executable instructions which, when executed by the computer 701, perform the various processes described above with regard to FIGS. 1-6. The computer 701 can also include computer-readable storage media having instructions stored thereupon for performing any of the other computer-implemented operations described herein.

The computer 701 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 701 might not include all the components shown in FIG. 7, can include other components that are not explicitly shown in FIG. 7, or might utilize an architecture completely different than that shown in FIG. 7.

As described herein, the computer 701 may comprise one or more of a PE router, a PE edge router, a BIER router and/or a BEFR. The computer 701 may include one or more hardware processors 704 (processors) configured to execute one or more stored instructions. The processor(s) 704 may comprise one or more cores. Further, the computer 701 may include one or more network interfaces configured to provide communications between the computer 701 and other devices, such as the communications described herein as being performed by the PE router, a PE edge router, a BIER router and/or a BEFR. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 722 may comprise any type of programs or processes to perform the techniques described in this disclosure for receiving, processing and/or transmitting a multicast join message, as well as other operations described herein. For instance, the programs 722 may cause the computer 701 to perform techniques for communicating with other devices using any type of protocol or standard usable for determining connectivity. Additionally, the programs 722 may comprise instructions that cause the computer 701 to perform the specific techniques for enabling multi-hop connectivity determination.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method for a subscribing Multipoint Label Distribution Protocol (mLDP) edge router in a network to subscribe to a multicast group, the network comprising a plurality of mLDP edge routers and a Bit Index Explicit Replication (BIER) core, wherein the subscribing mLDP edge router is one of the plurality of mLDP edge routers, the method comprising:
by the subscribing mLDP edge router, receiving a message including an indication of a Bit-Forwarding Egress Router (BFER) of the BIER core, wherein the BFER is associated with a destination mLDP edge router that is a source of data of the multicast group; and
by the subscribing mLDP edge router, transmitting a multicast join message to the destination mLDP edge router via the BFER, the multicast join message comprising at least:
the indication of the BFER; and
an indication of the destination mLDP edge router.

2. The method of claim 1, wherein:
the message including the indication of the BFER is received by the subscribing mLDP edge router in an interior gateway protocol (IGP) source announcement, via the BIER core, from the BFER.

3. The method of claim 1, further comprising:
by the BFER,
receiving the multicast join message;
removing, from the multicast join message, the indication of the BFER; and
transmitting the multicast join message with the indication of the BFER removed.

4. The method of claim 3, wherein:
the BFER is a first BFER; and
a second BFER of the BIER core is associated with the subscribing mLDP edge router:
the method further comprising:
by the second BFER,
receiving the multicast join message;
resolving the indication of the first BFER; and
transmitting the multicast join message with the indication of the first BFER resolved.

5. The method of claim 1, wherein:
the indication of the BFER is in a first Forwarding Equivalence Class (FEC) in the multicast join message transmitted by the subscribing mLDP edge router and the indication of the destination mLDP edge router is in a second FEC in the multicast join message transmitted by the subscribing mLDP edge router; and
the method further comprises the BFER removing the first FEC from the multicast join message and transmitting the multicast join message including the second FEC.

6. The method of claim 1, further comprising:
by the destination mLDP edge router, advertising the indication of the BFER.

7. The method of claim 6, further comprising:
by the destination mLDP edge router, determining the BFER to be the BFER of the BIER core closest to the destination mLDP edge router.

8. A system comprising:
a subscribing Multipoint Label Distribution Protocol (mLDP) edge router in a network comprising a plurality of mLDP edge routers and a Bit Index Explicit Replication (BIER) core, wherein the subscribing mLDP edge router is one of the plurality of mLDP edge routers and the subscribing mLDP edge router includes one or more processors and one or more non-transitory computer-readable media storing computer-executable instructions that, when executed by the one or more processors, cause the one or more processors to:
receive a message including an indication of a Bit-Forwarding Egress Router (BFER), of the BIER core, wherein the BFER is associated with a destination mLDP edge router that is a source of data of a multicast group; and
transmit a multicast join message comprising at least:
the indication of the BFER; and
an indication of the destination mLDP edge router.

9. The system of claim 8, wherein:
the message including the indication of the BFER is received by the subscribing mLDP edge router in an interior gateway protocol (IGP) source announcement, via the BIER core, from the BFER.

10. The system of claim 8, further comprising:
the BFER, wherein the BFER includes one or more processors and one or more non-transitory computer-readable media storing computer-executable instructions that, when executed by the one or more processors, cause the one or more processors of the BFER to:
receive the multicast join message;
remove, from the multicast join message, the indication of the BFER; and
transmit the multicast join message with the indication of the BFER.

11. The system of claim 10, wherein:
the BFER is a first BFER; and
the system further comprising:
a second BFER of the BIER core, wherein the second BFER is associated with the subscribing mLDP edge router, the second BFER including one or more processors and one or more non-transitory computer-readable media storing computer-executable instructions that, when executed by the one or more processors of the second BFER, cause the one or more processors of the second BFER to:
receive the multicast join message;
resolve the indication of the first BFER; and
transmit the multicast join message with the indication of the first BFER.

12. The system of claim 8, wherein:
the indication of the BFER is in a first Forwarding Equivalence Class (FEC) in the multicast join message transmitted by the subscribing mLDP edge router and the indication of the destination mLDP edge router is in a second FEC in the multicast join message transmitted by the subscribing mLDP edge router.

13. The system of claim 12, further comprising:
the BFER, including one or more processors and one or more non-transitory computer-readable media storing computer-executable instructions that, when executed by the one or more processors of the BFER, cause the one or more processors of the BFER to:
remove the first FEC from the multicast join message; and
transmit the multicast join message including the second FEC.

14. The system of claim 8, further comprising:
the destination mLDP edge router, including one or more processors and one or more non-transitory computer-readable media storing computer-executable instructions that, when executed by the one or more processors of the destination mLDP edge router, cause the one or more processors of the destination mLDP edge router to:
advertise the indication of the BFER.

15. The system of claim 14, the one or more non-transitory computer-readable media of the destination mLDP edge router further including computer-executable instructions causing the one or more processors of the destination mLDP edge router to:
determine the BFER to be the BFER of the BIER core closest to the destination mLDP edge router.

16. One or more non-transitory computer-readable storage media storing computer-readable instructions that, when executed, instruct a processing unit of a subscribing Multipoint Label Distribution Protocol (mLDP) edge router of a plurality of mLDP edge routers in a network to perform operations comprising:
receiving a message including an indication of a Bit-Forwarding Egress Router (BFER), of a Bit Index Explicit Replication (BIER) core of the network, associated with a destination mLDP edge router that is a source of data of a multicast group; and
transmitting a multicast join message to the destination mLDP edge router via the BFER, the multicast join message comprising at least:
the indication of the BFER; and
an indication of the destination mLDP edge router.

17. The one or more non-transitory computer-readable storage media of claim 16, wherein:
the message including the indication of the BFER is received by the subscribing mLDP edge router in an interior gateway protocol (IGP) source announcement, via the BIER core, from the BFER.

18. The one or more non-transitory computer-readable storage media of claim 16, wherein:
the indication of the BFER is in a first Forwarding Equivalence Class (FEC) in the multicast join message transmitted by the subscribing mLDP edge router and the indication of the destination mLDP edge router is in a second FEC in the multicast join message transmitted by the subscribing mLDP edge router.

19. The one or more non-transitory computer-readable storage media of claim 16, wherein:
the BFER is a first BFER; and
transmitting the multicast join message includes transmitting the multicast join message towards a second BFER of the BIER core, the second BFER associated with the subscribing mLDP edge router.

20. The one or more non-transitory computer-readable storage media of claim 16, wherein the operations further comprise:
receiving an advertisement that the destination mLDP edge router is a multicast source.

* * * * *